United States Patent [19]

Dessau et al.

[11] Patent Number: 4,568,787

[45] Date of Patent: Feb. 4, 1986

[54] CATALYSIS OVER ACTIVATED ZEOLITES

[75] Inventors: Ralph M. Dessau, Edison; George T. Kerr, Lawrenceville, both of N.J.

[73] Assignee: Mobil Oil Corporation, New York, N.Y.

[21] Appl. No.: 707,108

[22] Filed: Feb. 28, 1985

Related U.S. Application Data

[63] Continuation-in-part of Ser. No. 566,376, Dec. 28, 1983, Pat. No. 4,517,075, which is a continuation-in-part of Ser. No. 319,175, Nov. 9, 1981, Pat. No. 4,438,215.

[51] Int. Cl.$^4$ ............................ C07C 1/00; C07C 1/20
[52] U.S. Cl. ..................................... 585/639; 585/469; 585/475; 585/733
[58] Field of Search ............... 585/469, 475, 638, 639, 585/733

[56] References Cited

U.S. PATENT DOCUMENTS

| | | | |
|---|---|---|---|
| Re. 31,919 | 6/1965 | Butter et al. | 502/66 |
| 3,476,821 | 11/1969 | Brandenburg | 585/475 |
| 4,328,384 | 5/1982 | Daviduk et al. | 585/469 |
| 4,427,786 | 1/1984 | Miale et al. | 502/71 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,435,516 | 3/1984 | Chang et al. | 502/71 |
| 4,438,215 | 3/1984 | Dessau et al. | 502/71 |
| 4,443,554 | 4/1984 | Dessau | 502/71 |
| 4,444,900 | 4/1984 | Chang et al. | 502/71 |
| 4,444,902 | 4/1984 | Chang et al. | 502/86 |
| 4,461,845 | 7/1984 | Dessau | 502/27 |
| 4,468,475 | 8/1984 | Kuehl | 502/71 |
| 4,477,582 | 10/1984 | Miale | 502/77 |
| 4,478,950 | 10/1984 | Chu | 502/71 |
| 4,500,418 | 2/1984 | Miale et al. | 208/114 |
| 4,500,419 | 2/1985 | Miale et al. | 208/115 |
| 4,500,420 | 2/1985 | Miale et al. | 208/116 |
| 4,500,421 | 2/1985 | Chang et al. | 208/116 |
| 4,500,422 | 2/1985 | Miale et al. | 208/117 |
| 4,512,876 | 4/1985 | Miale et al. | 208/114 |
| 4,515,075 | 5/1985 | Dessau et al. | 208/111 |
| 4,515,682 | 5/1985 | Chang et al. | 208/111 |
| 4,524,140 | 6/1985 | Chang et al. | 502/71 |
| 4,526,880 | 7/1985 | Chu et al. | 502/71 |
| 4,530,756 | 7/1985 | Chang et al. | 585/475 |

*Primary Examiner*—John Doll
*Assistant Examiner*—Helane Myers
*Attorney, Agent, or Firm*—Alexander J. McKillop; Michael G. Gilman; Dennis P. Santini

[57] ABSTRACT

A process is provided for converting feedstock comprising oxygenates to product comprising hydrocarbons over a catalyst comprising a high silica crystalline zeolite which has been treated by contact with aluminum chloride vapor.

20 Claims, No Drawings

CATALYSIS OVER ACTIVATED ZEOLITES

CROSS-REFERENCE TO RELATED APPLICATION

This application is a continuation-in-part of application Ser. No. 566,376, filed Dec. 28, 1983, now U.S. Pat. No. 4,517,075, which was a continuation-in-part of application Ser. No. 319,175, filed Nov. 9, 1981, now U.S. Pat. No. 4,438,215.

BACKGROUND OF THE INVENTION

1. Field of the Invention

This invention relates to a process for conversion of lower aliphatic alcohols, carbonyls, ethers or analogues thereof to higher hydrocarbons over a catalyst comprising a crystalline zeolite, including a high silica-containing crystalline material, which has been treated by contacting said zeolite with aluminum chloride vapor, followed by hydrolysis and calcination.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

A number of U.S. patents teach heteroatom feed conversion. Examples of these are U.S. Pat. Nos. 3,894,104, 3,894,106, 3,894,107, 3,899,544, 3,965,205, 4,046,825, 4,156,698 and 4,311,865. Methanol is converted to gasoline in U.S. Pat. Nos. 4,302,619, 3,928,483 and 4,058,576 as examples. Methanol is converted to olefins and/or aromatics in, for example, U.S. Pat. Nos. 3,911,041, 4,025,571, 4,025,572, 4,025,575 and 4,049,735.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio of at least 100 which have been synthesized from a forming solution containing quaternary onium cations.

SUMMARY OF THE INVENTION

The present invention relates to a novel process for converting organic compounds such as lower aliphatic alcohols, carbonyls, ethers or analogues thereof to higher hydrocarbons over a catalyst comprising a zeolite of altered activity resulting from treating the zeolite in a special way. The treatment requires sequentially calcining the synthesized crystalline material under appropriate conditions, contacting the calcined material with aluminum chloride vapor under appropriate conditions, hydrolyzing the aluminum chloride contacted material and calcining the hydrolyzed material under appropriate conditions. The resulting zeolite material exhibits enhanced activity toward catalysis of the present process.

DESCRIPTION OF SPECIFIC EMBODIMENTS

Patents issuing from the parent applications of this application, i.e., U.S. Pat. Nos. 4,438,215 and 4,517,075, are incorporated entirely herein by reference.

The expression "high silica-containing crystalline material" is intended to define a crystalline structure which has an initial silica:alumina mole ratio greater than about 100:1, and more preferably greater than about 500:1, up to and including those highly siliceous materials where the initial silica:alumina mole ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are present due to impurity of the reaction solutions. It is to be understood that the expression "high silica-containing crystalline material" also specifically includes those materials which have other metals besides aluminum associated therewith, such as boron, iron, chromium, etc.

The zeolite starting materials utilized herein, including those having an initial silica:alumina mole ratio greater than about 100:1, may be prepared from reaction mixtures containing sources of various quaternary onium cations. The present process provides noted improvement regardless of which quaternary cation sources are present in said reaction mixtures. Non-limiting examples of cation sources to be used in the manufacture of the zeolite starting materials include onium compounds having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

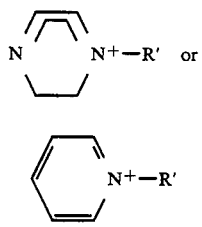

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The process of treating the zeolite for use herein is simple and easy to carry out although the results therefrom are dramatic. The process involves calcining a high silica crystalline material having a silica:alumina ratio of at least 100:1 and preferably of at least 500:1 which has been prepared from a reaction mixture containing quaternary onium ions by heating the same at a temperature within the range of from about 200° C. to about 600° C. in an atmosphere such as air, nitrogen, etc. and at atmospheric, superatmospheric, or subatmospheric pressure for from about 1 minute to about 48 hours. The calcined zeolite is thereafter contacted with aluminum chloride vapor, preferably admixed with an inert gas such as nitrogen, at a temperature ranging from about 100° C. to about 600° C. The amount of aluminum chloride vapor which is utilized is not narrowly critical, but usually 0.01 to 1 gram and preferably about 0.5 gram of aluminum chloride is used per gram of high silica crystalline material. Following the contact with aluminum chloride, the crystalline material is then hydrolyzed in water at a temperature ranging from about 20° C. to about 100° C., followed by a final calcination at a temperature ranging from about 200° C. to about 600° C. although temperatures of from about 450° C. to about 550° C. are preferred.

Of the zeolite materials advantageously used in accordance herewith, those having the structure of ZSM-5, ZSM-11, ZSM-5/ZSM-11 intermediate, ZSM-12, ZSM-23, ZSM-35, ZSM-38 and ZSM-48 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire teaching of which is incorporated herein by reference. ZSM-12 is described in U.S. Pat. No. 3,832,449, the entire contents of which are incorporated herein by reference. ZSM-23 is described in U.S. Pat. No. 4,076,842, the entire teaching of which is incorporated herein by reference. The entire contents of U.S. Pat. Nos. 4,016,245 and 4,046,859, describing ZSM-35 and ZSM-38, respectively, are incorporated herein by reference. ZSM-48 is described in U.S. Pat. No. 4,397,827, the entire teaching of which is incorporated herein by reference.

The feedstock to the present process comprises lower aliphatic alcohols, carbonyls, ethers or mixtures thereof. Feedstock alcohols will be aliphatic alcohols of from 1 to about 6 carbon atoms, preferably from 1 to 3 carbon atoms, e.g., methanol and ethanol. Feedstock carbonyls will be lower aliphatic carbonyls, such as, for example, acetone. Feedstock ethers will be lower aliphatic ethers of up to about 6 carbon atoms, e.g., from 2 to about 6 carbon atoms, such as dimethylether, n-propyl ether, p-dioxane, trioxane and hexose.

The product of this process will be predominantly hydrocarbons including olefins of from 2 to 5 or more carbon atoms with $C_2$ olefins usually less than about 10% of the total and $C_5+$ olefins usually less than about 15% of the total. Aromatic hydrocarbons, such as durene, are also produced. $C_3$ and $C_4$ olefins are desired chemical products, and $C_5+$ products are valuable as gasoline components.

In general, the feedstock is converted by the present process to hydrocarbons, e.g., olefins, and hyorocarbons including aromatics, e.g., gasoline components, with reaction conditions including a temperature of from about 275° C. to about 600° C., a pressure of from about 0.5 atmosphere to about 50 atmospheres and a liquid hourly space velocity of from about 0 5 hr$^{-1}$ to about 100 hr$^{-1}$ In practicing a particularly desired chemical conversion process, it may be useful to composite the above-described activity enhanced crystalline zeolite with matrix comprising material resistant to the temperature and other conditions employed in the process. Such matrix material is useful as a binder and imparts additional resistance to the catalyst for the severe temperature, pressure and reactant feed stream velocity conditions encountered in many processes. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

The following examples will illustrate the novel method of the present invention.

EXAMPLES 1-5

Four different high silica containing zeolites were prepared—all of which were synthesized from reaction mixtures containing tetraalkylammonium ions. These included three crystalline materials having the x-ray diffraction pattern of ZSM-5, having initial silica-to-alumina mole ratios of 600, 2860 and about 50,000 respectively. One sample of a crystalline material having the x-ray diffraction pattern of ZSM-11 and having an initial silica-to-alumina mole ratio of about 1,056 was also utilized.

The above as synthesized zeolites were calcined in either air or nitrogen at 1° C. per minute to about 540° C. where the temperature was maintained for about 10 hours. Two grams of each of the calcined zeolites were placed in a horizontal tube on one side of a fritted disc and one gram of aluminum chloride was placed on the other side. Dry nitrogen at 50-100 cc per minute was introduced from the direction of the zeolite while heating at 100° C. for one hour. The direction of the nitrogen flow was then reversed and the temperature raised to 500° C. at 2° C. per minute and maintained at 500° C. for ½ hour. After cooling the zeolite was transferred to another reactor and again heated to 500° C. in nitrogen to remove any residual unreacted aluminum chloride.

Each of the four zeolites was then hydrolyzed at 100 ml of water at room temperature for at least two hours. The hydrolyzed samples were filtered, washed well with water, air-dried, and then finally calcined at 540° C. for ten hours.

The results obtained, as well as the properties of the activity enhanced zeolites are shown in Table I.

As can be seen, the alpha value of each of the five zeolites was considerably increased in accordance with the activation method. Furthermore, this enhanced acid activity was clearly intrazeolitic as evidenced by the shape selective constraint index values.

TABLE I

| Example | 1 | 2 | 3 | 4 | 5 |
|---|---|---|---|---|---|
| Zeolite | ZSM-5 | ZSM-5 | ZSM-5 | ZSM-5 | ZSM-11 |
| $Si/Al_2$ | 600 | 2860 | 2500 | ~50,000 | 1056 |
| % Al (orig.) | 0.15% | 0.03% | — | <0.01% | <0.1% |
| % Al (after treatment) | 2.55% | 1.63% | — | 1.55% | 1.93% |
| Alpha (orig. in H—form) | 17 (est.) | 3 (est.) | 4 (est.) | 0.004 | 10 (est.) |
| Alpha (after treatment) | 102 | 75 | >100 | 70 | 101 |
| Increase in Alpha | 85 | 72 | >96 | 70 | 91 |
| Constraint Index (after treatment) | — | — | — | 4.1 | 4.8 |

EXAMPLE 6

A sample of untreated zeolite ZSM-5 having a $SiO_2/Al_2O_3$ molar ratio of 3300 and in the hydrogen form was contacted with a feedstock comprised of 50% aqueous methanol at about 400° C. and atmospheric pressure. Product effluent was analyzed and 50% methanol conversion to olefins with 3.4% $C_2=$ selectivity and 37.1% $C_3=$ selectivity confirmed.

EXAMPLE 7

A sample of the activity enhanced zeolite product of Example 3 was contacted with a feedstock comprised of 50% aqueous methanol at about 400° C. and atmospheric pressure. Product effluent analysis confirmed 47% methanol conversion to olefins with 36.9% $C_2=$ selectivity and about 25% $C_3=$ selectivity.

EXAMPLE 8

A sample of the activity enhanced zeolite product from Example 3 was steamed at 500° C. until its alpha activity was about 5. This steamed zeolite was then contacted with 50% aqueous methanol feedstock at about 400° C. and atmospheric pressure. Product effluent analysis confirmed 78% methanol conversion to olefins with 33.6% $C_2=$ selectivity and about 25% $C_3=$ selectivity. The alpha test is described in U.S. Pat. No. 3,354,078 and in *The Journal of Catalysis,* Vol. 4, pp. 522–529, August, 1965, each incorporated herein by reference as to that description. The constraint index is a measure of the selectivity of a particular catalyst and it involves conversion of normal hexane and 3-methylpentane. This test is described in many issued U.S. patents, including U.S. Pat. No 4,231,899, incorporated herein by reference as to that description.

What is claimed is:

1. A process for converting a feedstock comprising organic compounds selected from the group consisting of alcohol, carbonyl, ether and mixtures thereof to conversion products comprising hydrocarbon compounds which comprises contacting said feedstock at conversion conditions with a catalyst comprising a zeolite material prepared by a method comprising calcining a crystalline zeolite material having an initial silica:alumina mole ratio of at least about 100:1, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed crystalline material.

2. The process of claim 1 wherein said zeolite material has an initial silica:alumina mole ratio greater than about 500:1.

3. The process of claim 1 wherein said zeolite material has the structure of ZSM-5, ZSM-11, ZSM-5/ZSM-11 intermediate, ZSM-12, ZSM-23, ZSM-35, ZSM-38 or ZSM-48.

4. The process of claim 3 wherein said zeolite has the structure of ZSM-5 or ZSM-11.

5. The process of claim 1 wherein said catalyst is a composite of said zeolite material and a matrix.

6. The process of claim 5 wherein said matrix is alumina.

7. The process of claim 1 wherein said conversion conditions include a temperature of from about 275° C. to about 600° C., a pressure of from about 0.5 atmosphere to about 50 atmospheres and a weight hourly space velocity of from about 0.5 $hr^{-1}$ to about 100 $hr^{-1}$.

8. The process of claim 1 wherein said alcohol is methanol.

9. A process for converting a feedstock comprising organic compounds selected from the group consisting of alcohol, carbonyl, ether and mixtures thereof to conversion products comprising hydrocarbon compounds which comprises contacting said feedstock at conversion conditions with a catalyst comprising a zeolite material prepared by a method comprising calcining a crystalline zeolite material having an initial silica:alumina mole ratio of at least about 100:1 and the structure of zeolite ZSM-5, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed cyrstalline material.

10. The process of claim 9 wherein said zeolite material has an initial silica:alumina mole ratio greater than about 500:1.

11. The process of claim 9 wherein said catalyst is a composite of said zeolite material and a matrix.

12. The process of claim 11 wherein said matrix is alumina.

13. The process of claim 9 wherein said conversion conditions include a temperature of from about 275° C. to about 600° C., a pressure of from about 0.5 atmosphere to about 50 atmospheres and a weight hourly space velocity of from about 0.5 $hr^{-1}$ to about 100 $hr^{-1}$.

14. The process of claim 9 wherein said alcohol is methanol.

15. A process for converting a feedstock comprising organic compounds selected from the group consisting of alcohol, carbonyl, ether and mixtures thereof to conversion products comprising hydrocarbon compounds which comprises contacting said feedstock at conversion conditions with a catalyst comprising a zeolite material prepared by a method comprising calcining a crystalline zeolite material having an initial silica:alumina mole ratio of at least about 100:1 and the structure of zeolite ZSM-11, said crystalline material having been synthesized from a reaction mixture containing quaternary onium ions, contacting said calcined crystalline material with aluminum chloride vapor at a temperature of from about 100° C. to about 600° C., hydrolyzing said aluminum chloride contacted crystalline material and calcining said hydrolyzed cyrstalline material.

16. The process of claim 15 wherein said zeolite material has an initial silica:alumina mole ratio greater than about 500:1.

17. The process of claim 15 wherein said catalyst is a composite of said zeolite material and a matrix.

18. The process of claim 17 wherein said matrix is alumina.

19. The process of claim 15 wherein said conversion conditions include a temperature of from about 275° C. to about 600° C., a pressure of from about 0.5 atmosphere to about 50 atmospheres and a weight hourly space velocity of from about 0.5 $hr^{-1}$ to about 100 $hr^{-1}$.

20. The process of claim 15 wherein said alcohol is methanol.

* * * * *